(12) United States Patent
Jansen et al.

(10) Patent No.: US 6,310,172 B1
(45) Date of Patent: Oct. 30, 2001

(54) WATER-DISPERSIBLE POLYISOCYANATE PREPARATIONS FOR PRODUCING REPULPABLE PAPER

(75) Inventors: Bernhard Jansen, Köln; Bernd Thiele, Odenthal; Thomas Roick, Leverkusen, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/623,250
(22) PCT Filed: Feb. 24, 1999
(86) PCT No.: PCT/EP99/01189
   § 371 Date: Aug. 30, 2000
   § 102(e) Date: Aug. 30, 2000
(87) PCT Pub. No.: WO99/45051
   PCT Pub. Date: Sep. 10, 1999

(30) Foreign Application Priority Data

Mar. 6, 1998 (DE) .............................. 198 09 669

(51) Int. Cl.$^7$ .................................. C08G 18/56
(52) U.S. Cl. ............... 528/49; 252/182.22; 156/307.1; 527/301; 162/164.6; 560/26; 560/115; 560/158
(58) Field of Search ............... 252/182.22; 528/49; 156/307.1; 527/301; 162/164.6; 560/26, 115, 158

(56) References Cited

U.S. PATENT DOCUMENTS 3,428,592  2/1969  Youker ............................ 260/29.2
4,263,408  4/1981  Meyborg et al. ................. 521/51
4,960,772 10/1990 Sebag et al. .................... 514/231.2
6,080,831  6/2000 Jansen et al. .................... 528/65

FOREIGN PATENT DOCUMENTS 1228807    11/1903   (CA) .
196 40 205  4/1998   (DE) .

*Primary Examiner*—Rachel Gorr
(74) *Attorney, Agent, or Firm*—Joseph C. Gil; Richard E. L. Henderson

(57) ABSTRACT

This invention relates to water-dispersible polyisocyanates obtained by reacting a) at least one bishydroxy-functional compound of the formula (I)

$$HO-R_1-[O-CR_2R_3-O-R_1]_n-OH \qquad (I)$$

wherein $R_1$, $R_2$, $R_3$, and n are defined herein, with b) at least one polyisocyanate of the formula (II)

$$Q[NCO]_q \qquad (II)$$

wherein Q and q are defined herein, and subsequently, in any order, with c) at least one monofunctional polyether alcohol of the formula (III)

$$R_4-[O-R_5]_m-O-H \qquad (III)$$

wherein $R_4$, $R_5$, and m are defined herein, and optionally with d) at least one compound of the formula (IV)

$$H-O-[R_5-O]_o-N^+R_6R_7R_8 \ X^- \qquad (IV)$$

wherein $R^5$, $R^6$, $R^7$, $R^8$, O, and $X^-$ are defined herein.

9 Claims, No Drawings

WATER-DISPERSIBLE POLYISOCYANATE PREPARATIONS FOR PRODUCING REPULPABLE PAPER

The present invention relates to water-dispersible polyisocyanates, their preparation and their use for producing repulpable cellulose-containing materials.

The prior art has already disclosed a large number of paper auxiliaries based on polyisocyanates. Thus, for example, in EP-A 0 582 166, where, in addition to sizing, the treatment of paper to impart wet strength and dry strength by means of polyisocyanates which have tertiary amino and/or ammonium groups and comprise 0 to 30% by weight (based on the mixture) of ethylene oxide groups in the form of polyether chains is described.

However, the common feature of all papers produced using polyisocyanates in the pulp or treated in the surface is that, depending on the amount used, they can be repulped only with difficulty or not at all. Indeed, the point of the treatment of the paper to impart wet strength is to ensure mechanical strength on wetting with water; repulpability, for example in water or dilute, aqueous alkaline solutions, is therefore generally not possible. On the other hand, the recycling of broke from paper, cardboard and board production (e.g. deckle trim, other waste and off-spec batches) is expedient and necessary. There is therefore a demand for water-dispersible polyisocyanates which ensure wet strength and dry strength but which simultaneously impart to the cellulose-containing material repulpability under the conditions of papermaking.

WO 96/20309 has already disclosed repulpable cellulose-containing materials which can be produced using polyisocyanates containing ester groups.

The non-prior-published German Patent Application No. 196 40 205.0 describes water-dispersible polyisocyanates which are prepared using quatemized tertiary aminopolyalkylene oxide polyether alcohols, which are used as paper auxiliaries having improved absorptive capacity and likewise promise repulpability.

However, the increased requirements of the paper auxiliaries market include not only very good wet strength combined with good repulpability of the paper treated to impart wet strength, but also good water absorption, i.e. good absorptivity of the paper, which is important for many applications. In this respect, the paper auxiliaries known from the prior art are still in need of improvement.

The present invention relates to water-dispersible polyisocyanates, obtainable by reaction of:

a) at least one bishydroxy-functional compound of the structure (I):

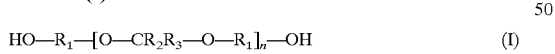

in which
$R_1$ represents an alkylene radical having two to ten carbon atoms or represents a radical —R—[O—R]$_p$—, R representing an alkylene radical having two to ten carbon atoms and p representing an integer from 0 to 12,
$R_2$ and $R_3$, independently of one another, represent $C_1$-to $C_{10}$-alkyl or hydrogen, with the proviso that, if one of the radicals $R_2$ or $R_3$ represents hydrogen, the other radical represents $C_1$-to $C_{10}$-alkyl, and
n represents an integer from 1 to 45, preferably from 1 to 30, with b) at least one polyisocyanate of the structure (II)

$$Q[NCO]_q \qquad (II)$$

in which
q represents a number greater than or equal to 2 and
Q represents an aliphatic hydrocarbon radical having 2 to 18, preferably 6 to 10, C atoms, a cycloaliphatic hydrocarbon radical having 4 to 15, preferably 5 to 10, C atoms, an aromatic hydrocarbon radical having 6 to 15, preferably 6 to 13, C atoms or an araliphatic hydrocarbon radical having 8 to 15, preferably 8 to 12, C atoms, said aliphatic, cycloaliphatic, aromatic and araliphatic hydrocarbon radicals each optionally containing one or more, preferably 1 to 4, heteroatoms from the series O, N, S, and subsequent reaction, in any order, with c) at least one monofunctional polyether alcohol of the structure (III)

in which
$R_4$ represents $C_1$–$C_4$-alkyl,
$R_5$ represents —CHX—CHY—, X and Y representing methyl, ethyl or hydrogen, with the proviso that, if one of the substituents X and Y denotes methyl or ethyl, the other always denotes hydrogen,
m represents an integer between 3 and 50, preferably between 3 and 25, and optionally d) with a compound of the structure (IV)

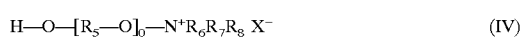

in which
$R^5$ has the meaning stated above for formula (III),
$R^6$ and $R^7$, independently of one another, represent $C_2$–$C_7$-alkyl or
$R^6$ and $R^7$, together with the N atom to which they are bonded, represent a 5- or 6-membered heterocyclic ring, preferably morpholine,
$R^8$ represents $C_1$–$C_7$-alkyl,
0 represents an integer from 2 to 60, preferably from 2 to 30, and
$X^-$ represents an anion, in particular halide, tosyl, trifluoromethylsulphate, methylsulphate, sulphate.

The present invention furthermore relates to a process for the preparation of waterdispersible polyisocyanates by reaction of a) at least one bishydroxy-functional compound of the abovementioned structure (I) with b) at least one polyisocyanate of the abovementioned structure (II) and subsequent reaction, in any desired order, with c) at least one polyether alcohol of the abovementioned structure (III) and optionally with d) at least one quatemized tertiary aminopolyether alcohol of the abovementioned structure (IV).

In the process according to the invention, optionally further auxiliaries and additives such as, for example, catalyzers or stabilizers for water-dispersible polyisocyanate formulations, known per se in polyurethane chemistry, and viscosity-reducing additives, such as solvents not reactive towards isocyanates, can be concomitantly used. Propylene glycol diacetate and methoxypropyl acetate may be mentioned by way of example for these "diluents".

The bishydroxy-functional compounds of the structure (I) are obtainable from the dialkyl ketals of ketones or dialkyl acetals of aldehydes. Among all dialkyl ketals and acetals, preferred ones are those which are based on aliphatic ketones and alde-hydes, such as, for example, acetone, methyl ethyl ketone, methyl propyl ketone, diethyl ketone, methyl isopropyl ketone, methyl isobutyl ketone, methyl tert-butyl ketone, dipropyl ketone, dinonyl ketone, 2-undecanone, and are obtainable from these by reaction with monoalcohols, such as, for example, methanol, ethanol, propanol, iropropanol, butanols, pentanols or higher molecular weight monoalcohols, such as the fatty alcohols, such as, for example, stearyl alcohol.

The following may be mentioned by way of example for aliphatic aldehydes: formaldehyde, acetaldehyde, propionaldehyde, n-butyraldehyde, iso-butyraldehyde, pivalinaldehyde, oenanthaldehyde, 2-ethylhexanal and higher aldehydes. Dialkyl acetals are obtainable from the aldehydes by reaction with the abovementioned monoalcohols.

These dialkyl ketals and acetals are reacted by means of acidic catalysts, such as, for example, p-toluenesulphonic acid, trifluoromethylsulphonic acid, acidically laden ion exchangers, or alkaline catalysts, such as, for example, sodium methylate, sodium ethylate, sodium isopropylate, with known diols, such as ethylene glycol, propylene glycol, diethylene glycol, dipropylene glycol, triethylene glycol, tripropylene glycol, oligomeric polyethylene or polypropylene glycols up to a molecular weight of 350, 1,3-propanediol, 1,4-butanediol, 1,5-pentanediol, neopentylglycol, 1,6-hexanediol, 3-methylpentane-1,5-diol, 2,5-hexanediol. Polyetherpolyols of the type known per se and having a functionality of 2, which are initiated on diols or diphenols and whose ether chains consist of ethylene oxide, propylene oxide and/or butylene oxide units, are likewise suitable for this reaction.

The preparation of the bishydroxy-functional compounds of the structure (I) is carried out by transketalization or transacetalation of the dialkyl ketals or acetals of aliphatic ketones or aldehydes with diols while simultaneously distilling off the resulting alcohol. With the use of suitable solvents, the alcohol can also be distilled off as an azeotrope with the solvent. Suitable catalysts for this reaction are acidic and basic substances, such as, for example, p-toluenesulphonic acid or sodium methylate, but also ion exchangers laden with hydrogen ions. Oligomeric structures having terminal hydroxyl functions are formed in this reaction. One variant of the process consists in using the diols in excess and, after the transketalization or transacetalation is complete, removing the excess diol again under mild conditions, optionally by thin-film distillation. The oligoketals or oligoacetals prepared in this manner can be used directly in the reaction with isocyanates.

Preferred bishydroxy-functional compounds (I) are oligomeric reaction products of acetonedialkyl ketals with oligomeric polyethylene glycols.

The following may be used as polyisocyanates of the structure (II): aliphatic, cycloaliphatic, araliphatic or aromatic isocyanates having an NCO functionality of 1.8 to 4.2. Polyisocyanates which have isocyanurate and/or allophanate and/or biuret and/or oxadiazine structures and are obtainable in a manner known per se by appropriate "modification" of aliphatic, cycloaliphatic, araliphatic or aromatic diisocyanates anates are preferably used. Such polyisocyanates (II) are described, for example, in DE-A 28 32 253, page 10 to 11.

Essentially modification products of hexamethylene diisocyanate and of 1-isocyanato-3,3,5-trimethyl-5-isocyanatomethyl-cyclohexane as a mixture with their higher molecular weight homologues obtained in the modification and having an isocyanate content of 17 to 25% by weight are preferred. The corresponding, substantially uretdione-free isocyanurates obtainable by the trimerization reaction known per se and having an average NCO functionality of 3.2 to 4.2 and the corresponding oxadiazinetriones preparable by the concomitant use of carbon dioxide and having an average NCO functionality of 1.8 to 3.5 and the trimeric polyisocyanates obtainable by corresponding processes and having essentially biuret structures are particularly preferred.

Polyether alcohols of the structure (III) are monohydric polyalkylene oxide polyether alcohols having, on statistical average, 2 to 70, preferably 2 to 60, polyalkylene oxide units per molecule, as obtainable in a manner known per se by alkoxylation of suitable initiator molecules.

For the preparation of these polyalkylene oxide polyether alcohols, any desired monohydric alcohols of the molecular weight range 32 to 150 g/mol can be used as initiator molecules. Preferably used initiator molecules are monofunctional aliphatic alcohols having 1 to 4 carbon atoms. The use of methanol or ethylene glycol monomethyl ether is particularly preferred. Alkylene oxides suitable for the alkoxylation reaction are in particular ethylene oxide, propylene oxide and butylene oxide, which can be used in any desired order or as a mixture in the alkoxylation reaction.

Preferred polyether alcohols (III) are methoxypolyethylene glycols of the molecular weight range 150 to 1000.

Less preferred are polyalkylene oxide polyester ethers which are not described by the structure (III), contain ester groups, are obtainable by reaction of aliphatic dicarboxylic acids having 2 to 8 carbon atoms or their esters or acid chlorides with polyethers from the group consisting of the polyethylene glycols, polypropylene glycols or their copolyether forms or simple mixtures of the two and have an average molecular weight of less than 10,000 g/mol, preferably less than 3000 g/mol, and are terminated by hydroxyl functions.

Quaternized aminopolyalkylene oxide polyether alcohols of the structure (IV) are known per se from EP-A 109 354 and EP-A 335 115. The compounds (IV) are preferably prepared in such a way that alcohols having at least one tertiary amino group and of the molecular weight range up to 150 g/mol are used as initiator molecules. Aliphatic alcohols having at least one tertiary amino function and having up to 15 carbon atoms are preferably used as initiator molecules. Monofunctional tertiary amino alcohols having up to 10 carbon atoms are particularly preferably used as initiator molecules. The quaternization of the tertiary amino function can be effected both before the alkoxylation and thereafter.

The alkoxylation is effected by processes of the prior art which are known per se, using known alkylating agents. The following may be mentioned by way of example here: dialkyl sulphates, alkyl chlorides, alkyl bromides, alkyl iodides, alkyl toluenesulphonates, alkylphosphonic esters and alkyl trifluoromethanesulphonates. Alkylating agents having an alkyl radical of one to seven carbon atoms are preferred. Methyl compounds are particularly preferred, in particular methyl chloride, dimethyl sulphate, methyl toluenesulphonate and methyl trifluoromethanesulphonate.

Alkylene oxides suitable for the alkoxylation reaction are in particular ethylene oxide, propylene oxide and/or butylene oxide, which can be used in any desired order or as a mixture in the alkoxylation reaction.

The abovementioned polyalkylene oxide polyether alcohols initiated on alcohols having tertiary amino groups or their quaternized form are preferably pure polyethylene oxide polyethers or copolyalkylene oxide polyethers which have at least one polyether sequence which has at least 2, in general 2 to 70, preferably 2 to 60, particularly preferably 2 to 50, ethylene oxide units and at least 60 mol %, preferably at least 70 mol %, of whose alkylene oxide units consist of ethylene oxide units. Preferred polyethylene oxide polyether alcohols of this type are monofunctional polyalkylene oxide polyethers which are initiated on an aliphatic alcohol having tertiary amino functions or their alkylated form and having up to 10 carbon atoms and which contain on statistical average 2 to 60 ethylene oxide units.

These polyethers may also contain ester groups; however, they are then less preferable.

The polyisocyanate preparations according to the invention can be used either separately or as a mixture also in combination with external ionic or nonionic emulsifiers. Such emulsifiers are described, for example, in Houben-Weyl, "Methoden der organischen Chemie [Methods of Organic Chemistry]", Thieme-Verlag, Stuttgart (1961), Vol. XIV/1, Part 1, page 190 to 208, in U.S. Patent No. 3,428,592 and in EP-A 0 013 112. The emulsifiers are used in an amount which ensures dispersibility.

The starting components are reacted in any desired order, in the absence of moisture, preferably without a solvent (one-pot reaction). It is also possible first to carry out the preliminary reaction of components a) and b) and then to react the common reaction product with the components c) and d). With an increasing amount of alcohol component e), the viscosity of the end product also increases, so that in certain cases (if the viscosity increases, for example, to above 100 Pas) it is possible to add a solvent which is preferably miscible with water but is inert with respect to the polyisocyanate. Suitable solvents are: alkyl ether acetates, glycol diethers, toluene, carboxylic esters, acetone, methyl ethyl ketone, tetrahydrofuran, dimethyl formamide, methoxypropyl acetate or mixtures thereof.

The reaction can be accelerated by catalysts known per se, such as dibutyltin dilaurate, tin(II) octanoate or, 1,4-diazobicyclo[2.2.2]octane in amounts from 10 to 1000 ppm, based on the reaction components. The reaction is carried out at temperatures up to 130° C., preferably at 10° C. to 100° C., particularly preferably at 20° C. to 80° C. The reaction can be monitored by titration of the NCO content or by evaluation of the NCO band of the IR spectrum at 2260 to 2275 $cm^{-1}$ and is complete if the isocyanate content is not more than 0.1% by weight above the value which corresponds to complete conversion. As a rule, reaction times of less than 24 hours are sufficient. A solvent-free synthesis is preferred.

The components a) to d) are preferably used in the following amounts:

| | |
|---|---|
| component a:) | 10 to 50 parts by weight |
| component b): | 50 to 90 parts by weight |
| component c): | 12 to 45 parts by weight |
| component d): | 0 to 25 parts by weight | reaction product of a) and b): 50 to 80 parts by weight where the sum of all parts by weight is always 100.

The polyisocyanates according to the invention are water-dispersible. This means that they are polyisocyanates which, in a concentration of up to 70% by weight, preferably 0.05 to 70% by weight, in particular 0.05 to 10% by weight, give fine-particled dispersions in water which have particle sizes of less than 500 nm, in particular of 80 to 500, preferably 100 to 350 nm. These aqueous dispersions of the polyisocyanates according to the invention are likewise a subject of the present invention.

The aqueous dispersions according to the invention may contain further, customary auxiliaries and additives, such as, for example, solvents, stabilizers.

The polyisocyanates according to the invention are technically easy to handle and have a shelf-life of months in the absence of moisture. The mixing units customary in industry (stirrers, mixers based on the rotor-stator principle and, for example, high-pressure emulsifying machines) are suitable for dispersing.

The preferred polyisocyanates according to the invention are self-emulsifying, i.e. they can be readily emulsified after addition to the aqueous phase, even without the action of high shear forces. As a rule, a static mixer is sufficient. The resulting dispersions according to the invention have a certain processing time which is dependent on the structure of the polyisocyanates to be used according to the invention, in particular on their content of basic N atoms. The processing time of such an aqueous emulsion is as a rule up to 24 hours. The processing time is defined as the time in which the optimum of the dry strength and wet strength effect is achieved.

To facilitate the incorporation into the aqueous phase, it may be expedient to use the water-dispersible polyisocyanate in solution in a solvent inert towards isocyanate groups. Suitable solvents are, for example, the abovementioned ones. The amount of the solvents in the solution of the polyisocyanate should be not more than 80% by weight, preferably not more than 50% by weight. However, the use, according to the invention, of solvent-free, water-dispersible polyisocyanates is particularly preferred.

A further subject of the present invention is the use of the aqueous polyisocyanate dispersions according to the invention for the treatment of cellulose-containing materials.

Suitable cellulose-containing materials are in particular paper, board or cardboard, each of which can optionally also contain amounts of wood fibres (groundwood).

Treatment is to be understood as meaning the imparting of dry strength and wet strength to said materials.

For imparting dry strength and wet strength, the aqueous polyisocyanate dispersions can be used in the pulp, in which case they are preferably added directly to the cellulose-containing dispersion of the fibre raw materials. For this purpose, the polyisocyanate according to the invention is dispersed in water at 20 to 80° C., and the dispersion obtained is added to a suspension of the fibre raw material or is dispersed directly in the suspension of the fibres. The paper is formed from this suspension as a result of drainage and is then dried. For dispersing the polyisocyanate, it is expedient to add 1 to 4 times the amount of water beforehand. Larger amounts of water are also possible. For the treatment of the surface, a prepared raw paper is treated with an aqueous polyisocyanate dispersion according to the invention and then dried. Use in the size press is possible. The polyisocyanate dispersed in water is transferred to the prepared paper web.

To achieve the optimum wet strength under conditions in practice, metering shortly before the headbox of the paper machine is particularly advisable. For testing, paper sheets having a basis weight of 50 to 100 $g/m^2$ are generally formed in the laboratory. According to the invention, the products can be metered into the solid in the pulp in the pH range of 4 to 10, preferably of 5.5 to 9. Use in the neutral pH range (pH 6 to 7.5) is particularly preferred. The cationic charge independent of the pH value results in the absorption behaviour being improved in the alkaline range too, completely in contrast to the water-dispersible polyisocyanates having only tertiary amino groups.

The amounts of aqueous polyisocyanate dispersion according to the invention which are used depend on the effect strived for. As a rule, it is sufficient to use amounts of 0.001 to 50% by weight, preferably 0.1 to 10% by weight, particularly preferably 0.1 to 2.0% by weight, of active ingredient, based on dry fibre raw material. The dose of active substance, based on fibre raw material, corresponds to that of known wet strength agents of the polyamidoamine/ epichlorohydrin type.

The aqueous polyisocyanate dispersions to be used according to the invention give ready-to-use papers having good wet strength from the machine. By storage of the prepared paper and/or postcondensation, it is possible to achieve a greater wet strength effect. Furthermore, the dry strength is improved compared with conventional dry strength agents. In addition, the papers obtained are distinguished by improved absorptivity.

The use according to the invention of the aqueous polyisocyanate dispersions according to the invention for treatment is carried out at the working temperatures customary in the paper industry. The processing time is dependent on the temperature. In the temperature range from 20 to 25° C., the processing time is relatively long. The wet strength effect after storage of the aqueous dispersions for 6 hours still reaches about 70% of the value in the case of immediate use of the dispersion. At higher temperature, for example at 50° C., processing within 6 hours is advisable. On the other hand, the maximum wet strength effect is surprisingly scarcely dependent on the time of contact with the cellulose. Papers which were formed immediately and after a contact time of 2 hours after addition of the [lacuna] to the paper fibre exhibit the same wet strength in each case. By suitable choice of the starting components, the strength of the paper can be adjusted in the desired manner.

The aqueous polyisocyanate dispersions according to the invention can be used in combination with other cationic auxiliaries, such as retention aids, fixing agents, drying agents and wet strength agents. The fixing of fillers can be further enhanced in particular by adding commercial retention aids of the type consisting of the cationic polycondensates and polymers, for example of the polyamildes, of the polyethlyleneimines, of the polyamidoamines and of the polyacrylamides and of the dual systems consisting of cationic or cationic and anionic and optionally particulate components, such as silica sols, etc.

This is of interest particularly when use in the laminated paper sector is intended. Preferred retention aids in the context of the invention are cationic polycondensates of polyamines, preferably with dichloroethane. However, it should be emphasized that the desired wet strength effect is achievable even without the addition of particular fixing agents. The strength of the paper can be increased in particular by combination with polysaccharides, such as hydroxyethylcellulose, carboxymethylcellulose, starch, galactomannans or their cationic derivatives.

Of course, the polyisocyanate dispersions to be used according to the invention can optionally be employed together with the abovementioned cationic auxiliaries, i.e. simultaneously or in succession. However, since many of the auxiliaries contain organically bound halogen, combination with AOX-free and/or low-AOX auxiliaries is particularly preferred since chlorine-free papermaking is the primary aim.

All cellulose-containing materials produced using the aqueous polyisocyanate dispersions according to the invention, such as paper, board or cardboard, are repulpable.

This repulping with the aim of reusing the fibre raw materials is possible in various ways:
a) By treatment with alkalis or acids, preferably with alkalis at slightly elevated temperature, 35 to 120° C., preferably 40 to 110° C., optionally with concomitant use of oxidizing agents, such as $H_2O_2$ or $K_2S_2O_8$.
b) By treatment with ozone.
c) By treatment with enzymes which cleave ester groups.
d) By treatment with microorganisms which cleave ester groups.

In the case of a cellulose-containing material having wet strength, these methods known per se lead to loss of the wet strength and to the possibility of recovering the fibre raw materials by defibrating the cellulose-containing materials.

The reactions a) to d) usually take place very smoothly, but a general indication of reaction times is not possible since they are dependent to a great extent on the degree of wet strength imparted and, for example, on the basis weight of the cellulose-containing materials to be repulped. Furthermore, it is possible to produce chemically degradable or biodegradable coating materials, adhesives, binders or plastics with the aid of the water-dispersible polyisocyanates last described, either as such or in aqueous suspension.

EXAMPLES a) Preparation of the Isocyanate Preparations

Preparation of an Oligoketal of the Structure I:

104 g of dimethoxypropane (1 mol) are initially introduced together with 106 g of diethylene glycol (1 mol), 300 g of toluene and 0.2 g of p-toluenesulphonic acid into a three-necked flask with stirrer and attached distillation bridge and are slowly heated up. The resulting azeotrope comprising methanol and toluene is distilled off and the heating temperature is increased according to the distillation, until 110° C. have been reached. The residue, a brown liquid, is neutralized by adding sodium bicarbonate; this causes the colour to change to red. The solution is then freed from the solvent in a rotary evaporator, and the OH number of the crude product is detennined. This is 360 mg KOH/g.

Preparation of a reaction product from the oligoketal of the structure I with a polyisocyanate of the structure II:

100 g (n OH=0.643 mol) of the oligoketal of the structure I (crude product) are reacted with 422.3 g (n NCO=1.28 mol) of 3,5-bis[6-isocyanatohexyl]-2,4,6-trisoxotetrahydro-1,3,5-oxadiazine (according to DE 29 09 906) with the addition of 1.0 g of triethylamine at room temperature. After the immediately beginning evolution of carbon dioxide has died down, the temperature is increased to 50° C. First, stirring is carried out for one hour, then a vacuum is applied and the product is both devolatilized and freed from triethylamine. The finished product has an isocyanate content of 12.5%.

Hydrophilization of the reaction product of the oligoketal I and the polyisocyanate of the structure II with a monofunctional ether of the structure III and a compound of the structure IV:

A methoxypolyethylne glycol having an average molecular weight of 500 is [lacuna] as the monofunctional ether of the structure III, and a polyether initiated on morpholinoethanol and based on ethylene oxide, having a number average molecular weight of 428 g/cmol and an OH number of 131 mg KO/fg, is [lacuna] as the compound of the structure IV. This polyether is reacted with methyl toluenesulphonate in the stoichiometric ratio of 1:1. Its OH number is then 89 mg KOH/g.

Various degrees of hydrophilization and cationization were realized; the preparations produced are designated as the isocyanate preparations 1 to 3. Their composition is shown in the following Table.

TABLE 1

| Isocyanate preparation | 1 | 2 | 3 |
|---|---|---|---|
| Amount of reaction product of I and II [g] | 73.6 | 72.2 | 70.8 |
| Amount of monofunctional polyether III [g] | 20.0 | 15.0 | 10.0 |
| Amount of compound IV [g] | 6.4 | 12.8 | 19.2 |
| Amount of dibutylphosphoric acid [g] | 0.05 | 0.05 | 0.05 |
| NCO content [%] | 6.8 | 6.8 | 6.6 |

The isocyanate preparations 1 to 3 are readily dispersible in water.

COMPARATIVE PRODUCT 1

An isocyanate preparation consisting of:
a) 22.6 parts by weight of an isocyanate mixture obtained from the trimerization of hexamethylene diisocyanate, having isocyanate groups, consisting essentially tially of tri(6-isocyanatohexyl) isocyanurate and its higher homologues and having an NCO content of 21.4% and a viscosity of 3000 mPas (23° C.).
b) 52.9 parts by weight of a prepolymer of castor oil and hexamethylene diisocyanate having an NCO content of 7.9% and a viscosity of 4533 mPas.
c) 18.1 parts by weight of a polyether initiated on 2-(2-methoxy)ethoxyethanol, based on ethylene oxide and having a number average molecular weight of 350 g/mol and an OH number of 160 mg KOH/g.
d) 6.4 parts by weight of the polyether described on page 16, line 1.

COMPARATIVE PRODUCT 2

This product is described in EP-A 0 582 166, in Example No. 24.
b) Production of Paper and Testing of the Wet Strength A mixture of 80% of bleached pine sulphate pulp and 20% of bleached birch sulphate pulp is beaten to a freeness of 38°SR at a consistency of 2.5% in a hollander. In each case 100 g of the pulp suspension obtained are then diluted to a volume of 1000 nl with water in glass beakers.

0.5% by weight and 1.0% by weight, based on the pulp, both of the comparative substances and of the water-dispersible isocyanates prepared, are added to the pulp dispersions after prior dispersing in water (dispersion containing 20% by weight of isocyanate preparation), and these dispersions are stirred for a further 3 minutes after addition.

Paper sheets having a basis weight of about 80 g/m² are then formed with the contents of the glass beakers on a sheet former (Rapid-Köthen design). The paper sheets are dried at 85° C. for 8 minutes in vacuo at 20 mmHg and further heated for 10 minutes at 110° C. After fixing under standard climatic conditions, 5 test strips 1.5 cm wide are cut from each paper sheet and are immersed in distilled water for 5 minutes. The subsequent breaking strength of the wet strips is then tested immediately on a tensile tester. These test results and those for the residual wet breaking strength and water absorption are summarized in the following Table.

The results for the wet breaking strength and for the liquid absorption are all the better the greater the determined numerical value, while the values of the wet breaking strength after NaOH treatment are all the better the lower the numerical value found for the residual wet breaking strength. The values thus determined for the residual wet breaking strength are a measure of the repulpability of the paper treated to impart wet strength.

TABLE 2

| | Isocyanate preparation: | | | Comparative product: | |
|---|---|---|---|---|---|
| | 1 | 2 | 3 | 2 | 1 |
| Wet breaking strength [N]: | | | | | |
| when 0.5% used: | 25.3 | 27.2 | 26.8 | 8.2 | 26.4 |
| when 1.0% used: | 29.4 | 31.1 | 30.3 | 15.1 | 29.7 |
| Residual wet breaking strength [%] after 5 h, 4% NaOH/50° C.: | | | | | |
| when 0.5% used: | 47.0 | 47.8 | 54.5 | 80.5 | 48.5 |
| when 1.0% used: | 60.2 | 56.9 | 66.0 | 83.4 | 63.9 |
| Liquid absorption [%]: | | | | | |
| when 0.5% used: | 71.5 | 64.6 | 57.0 | 63.5 | 18.0 |
| when 1.0% used: | 60.6 | 58.1 | 61.2 | 58.8 | 16.1 |

The measured values found show that the isocyanate preparations according to the invention result in an improvement in the achievable wet breaking strength, the residual wet breaking strength and the liquid absorption.

What is claimed is:
1. A water-dispersible polyisocyanate obtained by reacting
a) at least one bishydroxy-functional compound of the formula (I)

$$HO-R_1-[O-CR_2R_3-O-R_1]_n-OH \qquad (I)$$

wherein
R$_1$ represents an alkylene radical having two to ten carbon atoms or represents a radical —R—[O—R]$_p$—, wherein R represents an alkylene radical having two to ten carbon atoms and p represents an integer from 0 to 12,
R$_2$ and R$_3$, independently of one another, represent C$_1$- to C$_{10}$-alkyl or hydrogen, with the proviso that if one of the radicals R$_2$ or R$_3$ denotes hydrogen, then the other radical denotes C$_1$- to C$_{10}$-alkyl, and n represents an integer from 1 to 45, with
b) at least one polyisocyanate of the formula (II)

$$Q[NCO]_q \qquad (II)$$

wherein
q represents a number greater than or equal to 2, and
Q represents an aliphatic hydrocarbon radical having 2 to 18 C atoms, a cycloaliphatic hydrocarbon radical having 4 to 15 C atoms, an aromatic hydrocarbon radical having 6 to 15 C atoms, or an araliphatic hydrocarbon radical having 8 to 15 C atoms, wherein said aliphatic, cycloaliphatic, aromatic, and araliphatic hydrocarbon radicals each optionally contain one or more heteroatoms selected from the series consisting of O, N, and S, and subsequently, in any order, with
c) at least one monofunctional polyether alcohol of the formula (III)

$$R_4-[O-R_5]_m-O-H \qquad (III)$$

wherein $R_4$ represents $C_1$–$C_4$-alkyl, $R_5$ represents —CHX—CHY—, wherein X and Y represent methyl, ethyl, or hydrogen, with the proviso that if one of the substituents X and Y denotes methyl or ethyl, then the other of the substituents X and Y always denotes hydrogen, m represents an integer between 3 and 50, and optionally with d) at least one compound of the formula (IV)

$$H\text{—}O\text{—}[R_5\text{—}O]_o\text{—}N^+R_6R_7R_8X^- \qquad (IV)$$

wherein $R^5$ has the meaning stated above for formula (III), $R^6$ and $R^7$, independently of one another, represent $C_2$–$C_7$-alkyl or $R^6$ and $R^7$, together with the N atom to which they are bonded, represent a 5- or 6-membered heterocyclic ring, $R^8$ represents $C_1$–$C_7$-alkyl, O represents an integer from 2 to 60, and $X^-$ represents an anion.

2. A polyisocyanate according to claim 1 wherein the polyisocyanate (II) is an aliphatic, cycloaliphatic, araliphatic, or aromatic isocyanate having an NCO functionality of 1.8 to 4.2.

3. A polyisocyanate according to claim 1 wherein the polyisocyanate (II) has an isocyanurate and/or allophanate and/or biuret and/or oxadiazine structure.

4. A polyisocyanate according to claim 1 wherein the polyether alcohol (III) on statistical average have 3 to 50 polyalkylene oxide units per molecule.

5. A process for the preparation of water-dispersible polyisocyanates according to claim 1 comprising reacting a) at least one bishydroxy-functional compound of the formula (I)

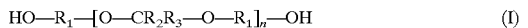

$$HO\text{—}R_1\text{—}[O\text{—}CR_2R_3\text{—}O\text{—}R_1]_n\text{—}OH \qquad (I)$$

wherein $R_1$ represents an alkylene radical having two to ten carbon atoms or represents a radical —R—[O—R]$_p$—, wherein R represents an alkylene radical having two to ten carbon atoms and p represents an integer from 0 to 12, $R_2$ and $R_3$, independently of one another, represent $C_1$- to $C_{10}$-alkyl or hydrogen, with the proviso that if one of the radicals $R_2$ or $R_3$ denotes hydrogen, then the other radical denotes $C_1$- to $C_{10}$-alkyl, and n represents an integer from 1 to 45, with b) at least one polyisocyanate of the formula (II)

$$Q[NCO]_q \qquad (II)$$

wherein q represents a number greater than or equal to 2, and

Q represents an aliphatic hydrocarbon radical having 2 to 18 C atoms, a cycloaliphatic hydrocarbon radical having 4 to 15 C atoms, an aromatic hydrocarbon radical having 6 to 15 C atoms, or an araliphatic hydrocarbon radical having 8 to 15 C atoms, wherein said aliphatic, cycloaliphatic, aromatic, and araliphatic hydrocarbon radicals each optionally contain one or more heteroatoms selected from the series consisting of O, N, and S, and subsequently, in any order, with c) at least one monofunctional polyether alcohol of the formula (III)

$$R_4\text{—}[O\text{—}R_5]_m\text{—}O\text{—}H \qquad (III)$$

wherein $R_4$ represents $C_1$–$C_4$-alkyl, $R_5$ represents —CHX—CHY—, wherein X and Y represent methyl, ethyl, or hydrogen, with the proviso that if one of the substituents X and Y denotes methyl or ethyl, then the other of the substituents X and Y always denotes hydrogen, m represents an integer between 3 and 50, and optionally with d) at least one compound of the formula (IV)

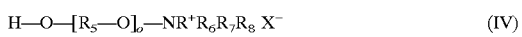

$$H\text{—}O\text{—}[R_5\text{—}O]_o\text{—}NR^+R_6R_7R_8\ X^- \qquad (IV)$$

wherein $R^5$ has the meaning stated above for formula (III), $R^6$ and $R^7$, independently of one another, represent $C_2$–$C_7$-alkyl or $R^6$ and $R^7$, together with the N atom to which they are bonded, represent a 5- or 6-membered heterocyclic ring, $R^8$ represents $C_1$–$C_7$-alkyl, O represents an integer from 2 to 60, and $X^-$ represents an anion.

6. An aqueous polyisocyanate dispersion comprising at least one water-dispersible polyisocyanate according to claim 1 dispersed in an aqueous phase.

7. An aqueous polyisocyanate dispersion according to claim 6 wherein the water-dispersible polyisocyanate has a concentration of 0.05 to 70%.

8. A method of treating cellulose-containing materials comprising applying to a cellulose-containing material an aqueous polyisocyanate dispersion according to claim 6.

9. A method of imparting dry and wet strength to paper, board, or cardboard comprising applying an aqueous polyisocyanate dispersion according to claim 6 to paper, board, or cardboard.

* * * * *